United States Patent Office 3,519,241
Patented July 7, 1970

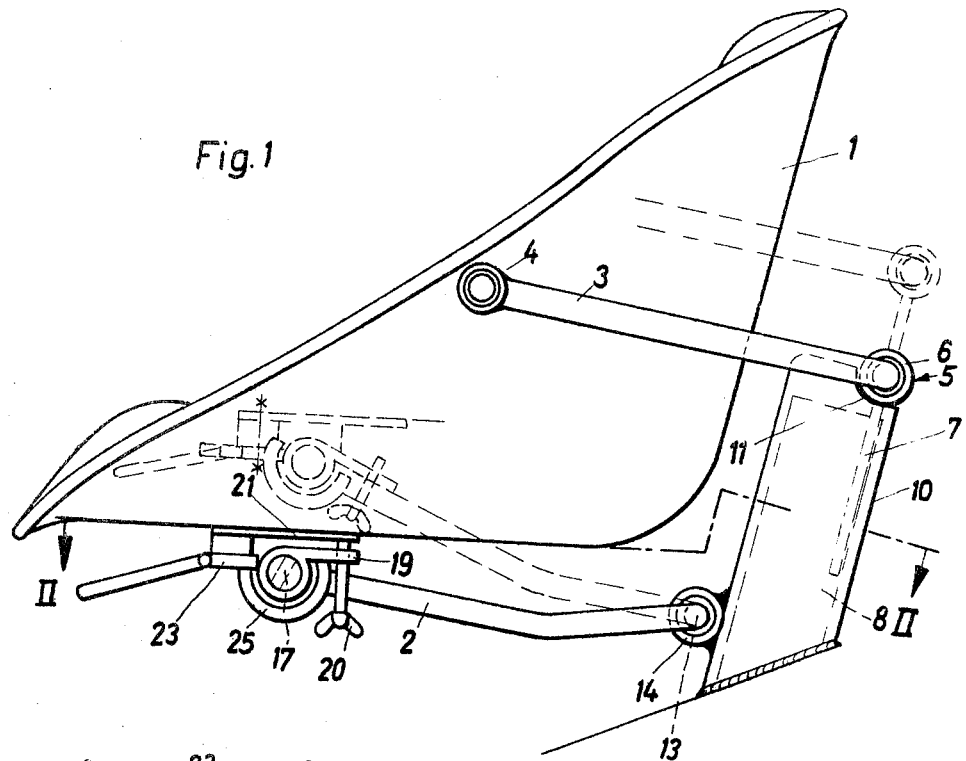
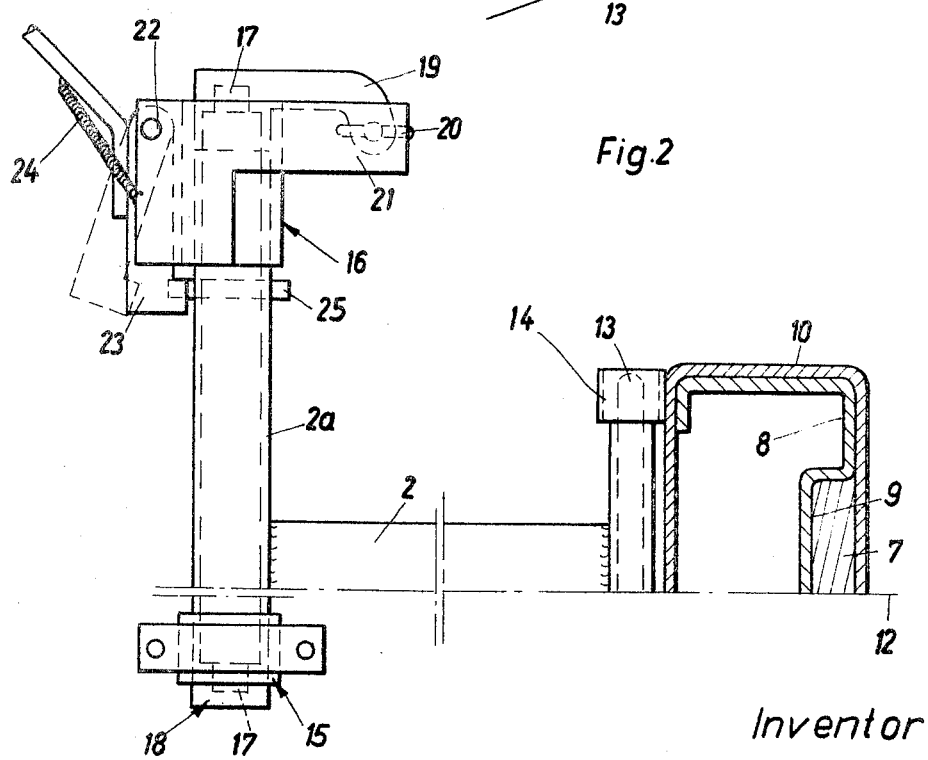

3,519,241
ROCKER GUIDE FOR SPRUNG SEATS
Arnold Tschursch, Hinrichsegen, Germany, assignor to Georg Fritzmeier KG, Grosshelfendorf uber, Munich, Germany
Filed May 23, 1967, Ser. No. 640,643
Claims priority, application Germany, May 31, 1966, F 49,352
Int. Cl. B60n 1/02
U.S. Cl. 248—399
12 Claims

ABSTRACT OF THE DISCLOSURE

An arrangement for resiliently mounting a seat in a vehicle or the like including a support member fixed to the vehicle, a seat, and at least one rocker arm pivotally connected at one end to the seat and at the other end to the support member. Spring means bias the seat upwardly and releasable locking means hold the seat at a predetermined position.

The invention relates to a rocker guide for sprung seats, particularly vehicle seats, comprising two rockers articulated at one end on a supporting foot fastened to the floor of the vehicle and at the other end to the seat and constituting a four-bar linkage, whereby the seat can be rocked upwards and rearwards without spring resistance.

This construction enables the seat to be rocked to the rear in such a manner that the vehicle can for example be operated in the standing position as is frequently customary and necessary. The resulting elimination of the spring abutment for this rocking of the seat in the upward direction entails the danger, in the event of very heavy shocks resulting from irregularities of the ground or emergency braking, that the seat will freely move upwards at high speed, so that the driver could lose control of the vehicle.

In order to avoid this disadvantage there is provided at one joint in the four-bar linkage a locking device coming into action at a preferably adjustable seat height and preventing the upward rocking of the seat. This locking device has to be released in order to enable the seat to swing up freely, while when the seat is let down it preferably snaps automatically into the actual seating position. This engagement of the locking device always takes place with the seat at the same height once the adjustment has been made, so that the spring can be prestressed without varying the height of the seat. In the event of no spring abutment being provided for the upward rocking of the seat, the spring is always in the unloaded condition. Through the new locking device the seat is pressed upwards against the action of the spring, after variation of the angle of rotation of the spring, into the height position in which the locking device engages, so that genuine prestressing is obtained. The locking device provided is advantageously a collar in the form of part of a ring which is concentric to the axis of the joint and disposed on a portion of a rocker lying in a joint axis, and in the open portion of which a catch is adapted to engage under spring tension.

In a rocker guide in which the rockers are offset in relation to one another in the longitudinal direction and are articulated one above the other on the supporting foot and extend from the latter forwards and upwards to the seat, while the front joint of the bottom rocker is disposed on the underside of the seat, the bottom rocker is advantageously rockably mounted on the underside of the seat by means of a cross-member and the collar in the form of part of the ring is provided on said cross-member, the catch being situated on a bearing body which is provided for the cross-member and which is made fast to the underside of the seat.

For the purpose of suspending the seat it is possible to provide in a joint axis of the four-bar linkage a torsion bar spring situated in a sleeve which is held rotatably on the underside of the seat or on the supporting foot and is made fast to the associated rocker and in one end of which the torsion bar spring is clamped fast, while at its other end the torsion bar spring is supported by means of a clamp lever, and with the interposition of an adjusting screw, loosely on an abutment on the underside of the seat or on the supporting foot.

If in a suspension of this type the torsion bar spring is situated beneath the seat shell, the collar in the form of part of a ring is provided on the sleeve surrounding it.

In order to be able to rock the seat as far back as possible after the locking device has been released, but at the same time to permit approximately parallel sliding of the seat in the normal position of the latter, that is to say to make both rockers approximately equal in length, the arrangement is preferably such that the vertical distance between the rocker joints situated on the supporting foot is adjustable, so that the seat is not only rockable upwards parallel to itself but in addition, depending on the choice of the vertical spacing of the joints, is also tippable in the forward direction. This can be achieved most simply by providing the rear joint of the top rocker on a strut guided on the supporting foot.

The invention will be explained more fully below with reference to two exemplified embodiments and with the aid of diagrammatical drawings, in which:

FIG. 1 shows a rocker arrangement constructed in accordance with the invention for a sprung vehicle seat, in side elevation;

FIG. 2 shows on a larger scale a sectional elevation along the line II—II in FIG. 1, this illustration however being turned through 180°;

Figure 3:
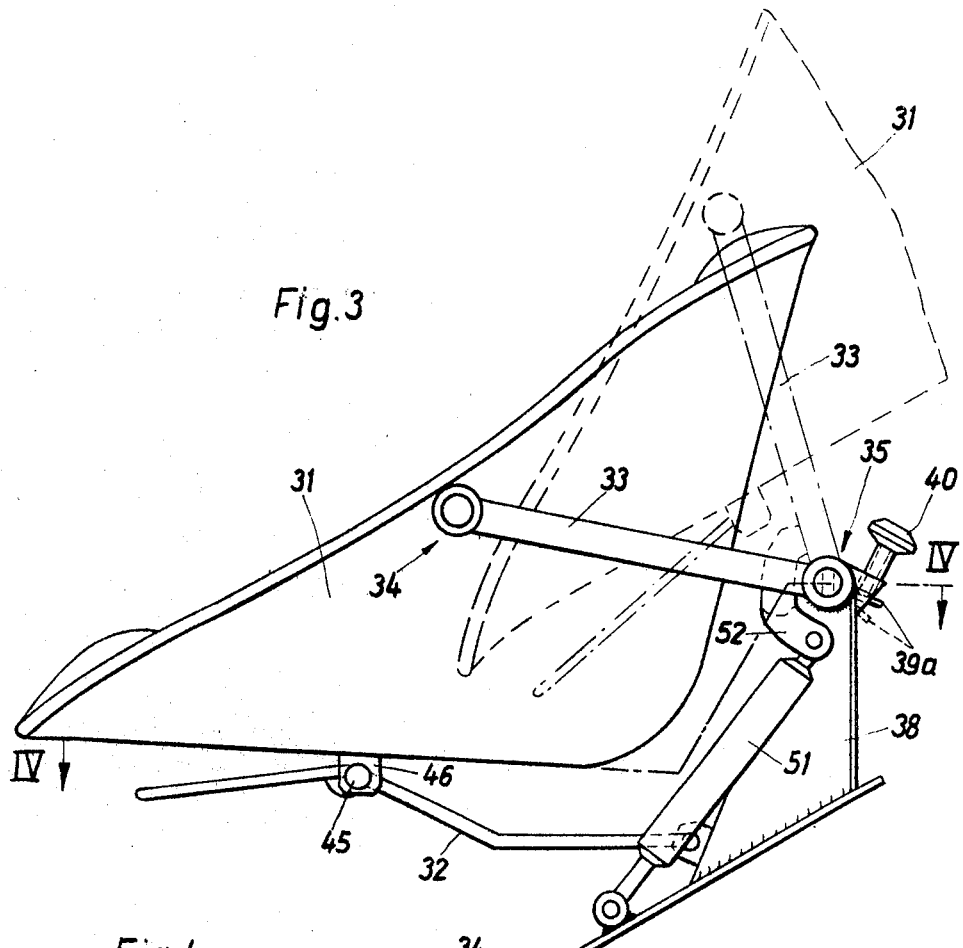
FIG. 3 illustrates another form of construction of a rocker guide for a sprung vehicle seat in side elevation.

According to FIGS. 1 and 2 the shell 1 of the vehicle seat illustrated is supported on the vehicle with the aid of a lower rocker 2 and an upper rocker 3, said rockers forming a parallelogram guide in the position of the seat illustrated. The rocker 3 is a U-shaped bow which embraces the seat shell 1 at the sides and is articulated to the side parts at 4. The other end is rotatably mounted at 5 in a sleeve 6 which is joined fast to a strut 7 which is guided in a supporting foot 8 joined fast to the vehicle floor and inclined obliquely backwards.

In accordance with FIG. 2 the supporting foot 8 has an approximately C-shaped profile, the flange 9 of which is recessed inwards to the extent of the thickness of the strut 7. A shoe 10 of box-shaped profile slidable on the supporting foot engages over the latter and at the top end is recessed over the entire length in the form of an arc of a circle and there serves as support 11 for the sleeve 6 made fast to the strut.

The bottom rocker 2 is held to the bottom end of the shoe 10 on both sides of the line of symmetry 12 by means of a pin 13 in bearings 14. The other end of the rocker 2 is welded to a sleeve 2a which is rotatably mounted in the bearings 15 and 16 beneath the seat shell 1 and which surrounds a torsion bar spring 17. The torsion bar spring is clamped fast in the sleeve end 18 held in the bearing 15 and at the other end is supported by means of a clamp lever 19 rotatable in the bearing 16, and with the interposition of an adjusting screw 20, against an abutment 21 which forms part of the bearing 16 and is made fast to the underside of the seat shell.

A catch 23 is articulated at the side at 22 on the bearing housing 16 and is adapted to rock against the tension of the spring 24 into the position shown in broken lines. In the position shown in solid lines the catch engages behind a collar 25 in the form of part of a ring, which is mounted fast on the sleeve 2a. In this position of the catch, which is shown in solid lines in FIG. 1 and in FIG. 2, the seat shell 1 cannot be rocked upwards, since the catch prevents a corresponding relative rotation between the sleeve 2a and the bearing casing 16. If however the catch is pulled out of the locking position, as indicated in FIG. 2, the sleeve 2a can be moved freely in one direction of rotation in relation to the bearing casing 16, so that the seat shell 1 can be swung rearwards and upwards without hindrance. As indicated by the broken line in FIG. 1, the adjusting screw 20 lifts off the abutment 21, while the catch 23 slides on the annular collar 25.

When the seat is lowered again, the catch 23 springs back into the opening in the annular collar 25, as can best be seen from FIG. 1. This vertical positon of the seat predetermined by the locking device remains unchanged, even if the initial stress, that is to say the angular position of the torsion bar spring in relation to the bearing casing 16 is varied with the aid of the adjusting screw 20. If the catch were not provided, the position of the height of the seat would also vary on each rotation of the adjusting screw 20.

If the seat shell 1 is to be raised rearwardly and not only parallel to itself, the sleeve 6 can be raised until the seat shell tips forwards after passing a dead center position. For this purpose the strut 7 has to be raised in the manner indicated in broken lines in FIG. 1 until the four-bar linkage overcomes the top dead center and the seat shell tips forwards.

Figure 4:
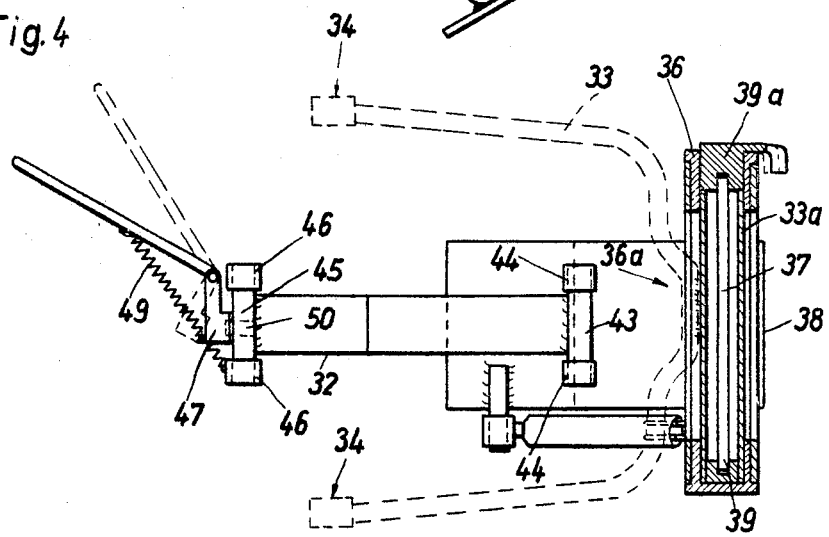
FIG. 4 is a section along the line IV—IV in FIG. 3, the upper rocker being shown in broken lines.

According to FIGS. 3 and 4 the seat shell 31 is likewise guided by means of two rockers 32 and 33 forming a four-bar linkage, said rockers being offset in relation to one another in the direction of the length of the vehicle and being articulated one above the other on the supporting foot 38. In this case also the upper rocker 33 is a U-shaped bow which at 34 is articulated at the side on the seat shell 31. The other end of said rocker is mounted in a stationary mounting at 35 on the supporting foot 38, this end being welded to a sleeve 33a which in turn is mounted in a sleeve 36 made fast to the supporting foot and open at 36a, on the side where this rocker is situated, over the rocking angle range of the latter. The sleeve 33a surrounds a torsion bar spring 37 which is made fast by one end to the sleeve 33a and at the other end is connected to a clamp lever 39a, which together with the sleeve 33a is mounted rotatably in the sleeve 36 and outside the latter bears against an adjusting screw 40 which is held on the supporting foot and by which the initial stress of the torsion bar spring can be varied. The bottom rocker 32 is articulated by means of a pin 43 in bearings 44 on the bottom end of the supporting foot 38 and by means of a cross-member 45 is articulated in bearings 46 on the underside of the seat shell. A catch 47 is articulated on one of the bearings 46 and is adapted to rock against the tension of the spring 49 into the position shown in broken lines (FIG. 4). In the position shown in solid lines (FIG. 4) the catch engages behind a collar 50 in the form of part of a ring, which is mounted fast on the cross-member 35. As in the embodiment illustrated in FIGS. 1 and 2, the seat shell cannot be swung upwards when the catch is in this position. When on the other hand the catch is disengaged, as shown in broken lines in FIG. 4, the seat shell can be swung upwards as illustrated in FIG. 3 (broken lines), the clamp lever 39a lifting off the adjusting screw 40. In conjunction with the collar in the form of part of a ring, here again the catch ensures that through the engagement of the catch the seat is always brought into the same vertical position or position of use, whatever initial tension the torson bar spring is given by movement of the adjusting screw 40.

In other to damp the oscillating movements of the seat, a shock absorber 51 may be provided which is articulated by one end at the bottom to the supporting foot and by the other end is articulated at the top to a lever 52 made fast to the upper rocker 33.

The application of the locking device according to the invention is not restricted to the above described forms of construction of a seat guide. On the contrary, the locking device may be used in any seat guide in which one guide element is a rocker. The locking device can in such arrangements always be used to limit the movement of the seat in the upward direction and ensures that the seat will always have the same starting height, since the catch always engages when the rocker is in the angular position once selected, which may be adjustable.

What is claimed is:

1. An arrangement for resiliently mounting a seat on a vehicle or the like, said arrangement comprising a support member affixed to said vehicle, at least one rocker arm pivotally mounted at its front end to said seat and at its rear end to said support member by means of respective pivot connections, spring means resisting downward movement of the seat with respect to a normal unloaded position of the seat and being out of operation upon opposite movement of the seat beyond said normal position, means for resistably engaging said spring means upon downward movement of said seat, releasable locking means engageable with one pivot connection of said rocker arm at the normal position of said seat to prevent pivotal movement of said pivot connection upon upward movement of said seat beyond said normal position, and wherein said locking means comprises a collar having a C-shape and a latch, said collar being fixedly and concentrically mounted to a pivot shaft forming part of one of said pivot connections and being rigidly connected to said rocker arm, spring means biasing said latch into the open portion of said C-shaped collar to engage with one end of said ring section in a blocking manner.

2. The arrangement of claim 1, in which said at least one rocker arm comprises an upper and a lower rocker arm, said arms being displaced with respect to each other in the longitudinal direction of said vehicle and being pivotally fastened by pivot connections at their rear ends to said support member and by their forward ends to said seat thereby extending in a forward and upward direction from said support member, said lower arm having a transverse member pivoted to the lower surface of said seat, said collar being rigidly secured to said transverse member, said latch being mounted to the lower surface of said seat for releasable engagement with said open portion of said collar.

3. The arrangement of claim 2, wherein said latch further comprises a handle extending underneath said seat for releasing said latch.

4. The arrangement of claim 2, wherein said spring means is a torsion rod, wherein said transverse member is a sleeve rotatably mounted at said lower surface of said seat and rigidly connected to the front end of said lower rocker arm, said sleeve extending in a direction substantially perpendicular to the longitudinal direction of said rocker arm and enclosing said torsion rod, and wherein said means for resistably engaging said spring means comprises a clamping lever fixedly mounted to one end of said torsion rod and adapted to engage the lower surface of said seat through an adjustable screw when said seat is subjected to downward movement, the other end of said torsion rod being clamped to one end of said sleeve.

5. The arrangement to claim 2, wherein said spring means is a torsion rod, a sleeve rotatably mounted on said support member and rigidly connected to the rear end of said upper rocker arm, said sleeve extending in a direction substantially perpendicular to the longitudinal direction of said upper rocker arm and enclosing said torsion rod, a clamping lever fixedly mounted to one end of said torsion rod and adapted to engage abutment means provided at said support member through an adjustable screw when said seat is subjected to downward movement, the other end of said torsion rod clamped to one end of said sleeve.

6. The arrangement of claim 4, comprising further a strut-like member pivotally mounted to the rear end of said upper rocker arm through a rear pivot means, said strut-like member extending in a direction substantially normal to said rocker arm and guided reciprocally in said support member.

7. The arrangement of claim 6, further comprising a shoe engaging said support member and being movably guided with respect to said support member in longitudinal direction thereof, said shoe constituting a guide surface for said strut-like member, said lower rocker arm being pivotally mounted to said shoe through a second pivot means.

8. The arrangement of claim 7, wherein said support member is of substantially C-shaped cross-section and wherein said shoe is of hollow, substantially rectangular cross-section telescopically enclosing said support member, said support member and said shoe, respectively, defining between adjacent walls a recess for receiving said strut-like member.

9. The arrangement of claim 8, wherein said strut-like member is formed of a substantially flat piece of sheet metal of substantially uniform cross-section and wherein the recess for receiving said strut-like member is defined by a substantially planar wall portion of said hollow rectangular profile of said shoe and by a U-shaped recessed opposite wall portion of said support member, the contours of said U-shaped recessed portion substantially corresponding to the contours of said strut-like member.

10. The arrangement of claim 7, wherein said upper rocker arm is a bow embracing said seat, said rear pivot means comprising a substantiailly cylindrical sleeve rigidly connected with said strut-like member, said shoe being provided at its top with a curved recess for receiving and supporting said sleeve.

11. The arrangement of claim 6, wherein said strut-like member extends from the rearward portion of said support member remote from said seat.

12. An arrangement for resiliently mounting a seat on a vehicle or the like, said arrangement comprising a support member affixed to said vehicle; and a member slidably guided and supported on said support member; a lower rocker arm pivotally mounted at its rear end to a lower point of said slidably guided member through a first pivot means and at its front end to a lower point of said seat; an upper rocker arm pivotally mounted at its rear end to an upper point of said slidably guided member through a rear pivot means and at its front end to an upper point of said seat through a second pivot means; said seat, said slidably guided member and said rocker arms forming a four-point linkage; spring means adapted to counteract to downward movement of said four-point linkage and abutment means for coupling said spring means to said four-point linkage when a certain predetermined first point of downward movement of said four-point linkage is reached; and locking means automatically becoming operative when said seat is moved downward at least a certain distance beyond said first predetermined point to a second predetermined point, thereby keeping said four-point linkage in a biased condition and preventing upward movement of said seat beyond said second predetermined point, said rear pivot means being supported by said slidably guided member when said linkage is in said biased condition and haviing a strut-like extension slidably inserted into a recess formed between said support member and said slidably guided member.

References Cited

UNITED STATES PATENTS

| | | | |
|---|---|---|---|
| Re. 26,162 | 2/1967 | Simons et al. | 248—400 |
| 3,215,386 | 11/1965 | Swenson | 248—400 |
| 3,268,200 | 8/1966 | Eicher | 248—399 |
| 3,304,044 | 2/1967 | Campbell et al. | 248—399 |
| 3,325,136 | 6/1967 | Radke et al. | 248—400 |
| 3,345,106 | 10/1967 | Tschursch et al. | 248—399 |
| 3,178,148 | 4/1965 | Mauke | 248—399 |
| 3,376,008 | 4/1968 | Tschursch | 248—376 |

FRANCIS K. ZUGEL, Primary Examiner

U.S. Cl. X.R.

248—373; 297—308